United States Patent [19]

Chin et al.

[11] Patent Number: 5,251,137
[45] Date of Patent: Oct. 5, 1993

[54] VEHICLE HANDLING CONTROL METHOD FOR ANTILOCK BRAKING

[75] Inventors: Yuen-Kwok Chin; William C. Lin, both of Troy, Mich.

[73] Assignee: General Motors Corporation, Detroit, Mich.

[21] Appl. No.: 727,616

[22] Filed: Jul. 10, 1991

[51] Int. Cl.⁵ .................................................. B60T 8/58
[52] U.S. Cl. .................................... 364/426.02; 303/95; 303/100
[58] Field of Search ...................... 364/426.02, 426.03; 180/197; 303/95, 100, 103, 109

[56] References Cited

U.S. PATENT DOCUMENTS

| | | | |
|---|---|---|---|
| 4,484,280 | 11/1984 | Brugger et al. | 364/426.03 |
| 4,779,696 | 10/1988 | Harada et al. | 180/197 |
| 4,844,556 | 7/1989 | Fennel et al. | 303/108 |
| 4,844,557 | 7/1989 | Giers | 364/426.02 |
| 4,852,009 | 7/1989 | Jonner et al. | 303/100 |
| 4,862,368 | 8/1989 | Kost et al. | 364/426.02 |
| 4,898,431 | 2/1990 | Karnopp et al. | 303/100 |
| 4,902,076 | 2/1990 | Ushijima et al. | 303/109 |
| 4,933,856 | 6/1990 | Leiber | 180/197 |
| 4,941,095 | 7/1990 | Imaseki et al. | 364/424.05 |
| 4,998,593 | 3/1991 | Karnopp et al. | 303/100 |
| 5,134,352 | 7/1992 | Matsumoto et al. | 303/100 |
| 5,140,524 | 8/1992 | Matsuda | 303/95 |

OTHER PUBLICATIONS

"Honda Traction Control System," Jan. 23, 1989, Honda Motor Co. Ltd., PR Division, pp. 1-10.

*Primary Examiner*—Gary Chin
*Attorney, Agent, or Firm*—Howard N. Conkey

[57] ABSTRACT

An algorithm is provided for improved lateral force during cornering while in antilock braking mode. For each wheel, the peak slip value at which maximum adhesion between tire and road occurs is determined, and the peak value is reduced by offsets (or factors) to increase lateral force according to the cornering maneuver in progress to derive a target slip value. A cornering offset and an evasive offset are functions of steering wheel angle and steering wheel rotation rate, respectively, and of vehicle deceleration. When slip is determined using average vehicle speed, a geometry correction term which is a function of steering angle, vehicle speed and deceleration is added to the target value. The offsets and the correction term have different values for inside and outside wheels.

15 Claims, 9 Drawing Sheets

VEHICLE HANDLING CONTROL METHOD FOR ANTILOCK BRAKING

FIELD OF THE INVENTION

This invention relates to antilock brake controls and particularly to such controls having compensation of the effects of cornering to enhance the cornering ability of the vehicle.

BACKGROUND OF THE INVENTION

Typical technology for antilock braking are based on the two following principles: (1) the brake is controlled in a cyclic sequence consisting of periods of pressure application, pressure dump, and pressure hold according largely to the comparison of wheel deceleration with prescribed thresholds, and, to a lesser degree, the wheel slip information, and (2) such pressure cycles control the average wheel slip to maximize the road adhesion for maximum tire tractive force in the longitudinal direction. This type of control is generally known as peak-seeking control.

The peak-seeking method offers the best performance in terms of the shortest stopping distance during braking when vehicle motion is restricted to a straight-line maneuver. Under this situation, the only tractive force the tire needs is in the longitudinal direction. Two characteristics of that method is, first, since the control results in hunting around the maximum longitudinal tractive force, the average longitudinal tractive force is lower than the available maximum force, and second, it cannot provide additional lateral tractive force for cornering during antilock braking.

An algorithm has already been proposed in "Brake Control for Wheel Slip Regulation", No. 29549, Research Disclosure, November 1988, for regulating the wheel slip at a different level than that corresponding to the maximum longitudinal tire tractive force when the need of vehicle cornering is called for during antilock braking. The advantage of controlling the wheel slip at the different level is to gain additional lateral force for cornering as desired. That system computes the wheel slip based on wheel speed and vehicle speed, wheel-slip error, the rate of wheel-slip error and a linear combination of wheel-slip error and the rate of wheel-slip error as a control index; and determining the desired status of the electrohydraulic brake actuator. The effect of cornering and of vehicle steering geometry on the wheel-slip at each wheel is not considered, rather a single wheel slip for all wheels is determined.

SUMMARY OF THE INVENTION

It is therefore an object of the invention to control the wheel slip at each wheel during antilock braking to an off-peak wheel slip level when necessary for enhanced cornering ability.

The invention is carried out in a vehicle having an antilock brake system by a method of enhancing cornering ability during antilock brake operation comprising the steps of: measuring vehicle deceleration; determining the wheel slip of each wheel; sensing the amount of steering wheel rotation and calculating the rate of rotation; calculating for each wheel the peak slip value which can generate the highest amount of surface adhesion; calculating a cornering offset for each wheel as a function of steering wheel rotation, calculating an evasive offset as a function of the rate of steering wheel rotation and vehicle deceleration; calculating a target slip value of each wheel as the sum of the evasive offset, the cornering offset and the peak slip value; and regulating each wheel to the respective target slip value.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
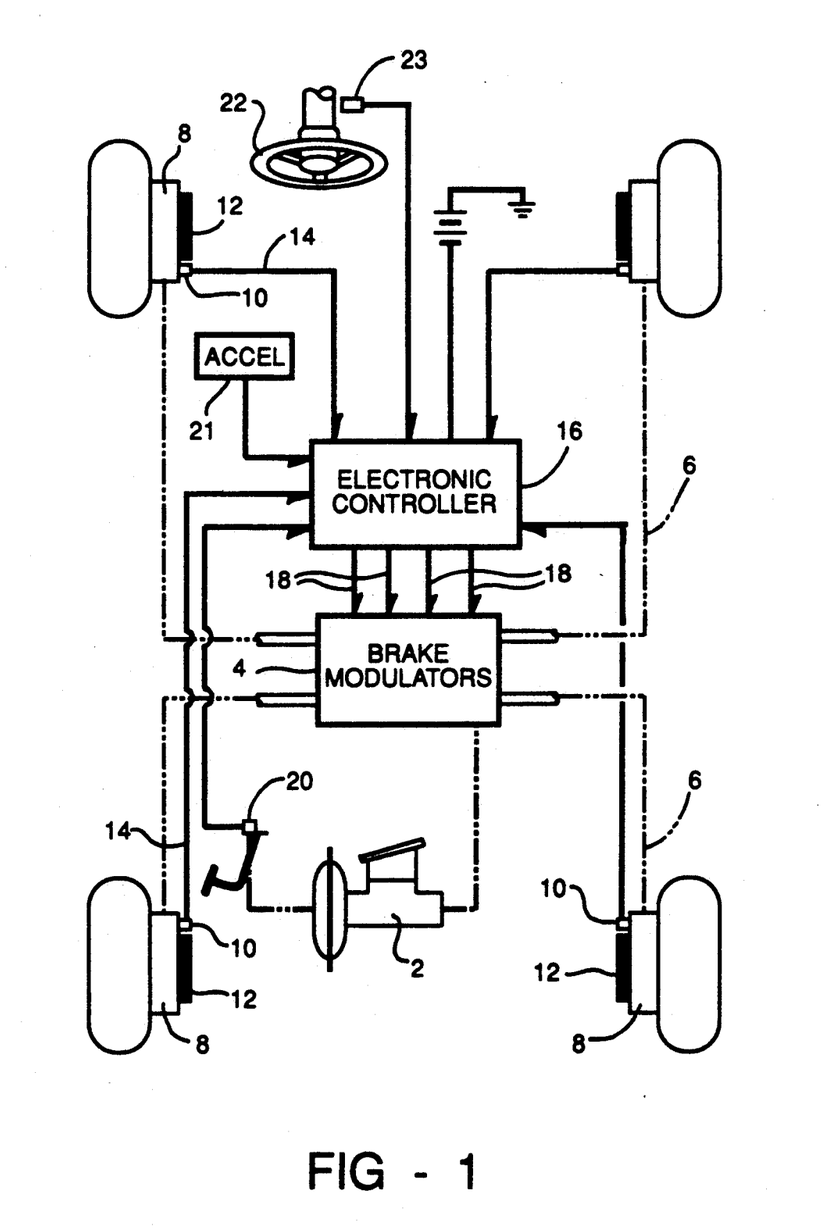
FIG. 1 is a schematic diagram of an antilock braking system according to the invention.

FIG. 1 illustrates the vehicle brake system. A hydraulic boost unit 2 couples master-cylinder pressure to brake modulators 4 which supply brake pressure via brake lines 6 to each wheel brake 8. The construction and operation of the modulators is more clearly set forth in the U.S. Pat. No. 4,881,784 issued to Leppek. A wheel speed sensor 10 on each brake adjacent a tone wheel 12 is connected by conductors 14 to an electronic controller 16 which is programmed to supply a modulator control signal via conductors 18 to each of the modulators 4. A discrete brake application sensor 20 such as a switch responsive to brake pedal movement and a chassis accelerometer 21 also provide input signals to the controller 16. Information from the chassis accelerometer is used to estimate vehicle speed, however a ground speed sensor could be used instead to directly vehicle speed. Alternatively, sensors may be mounted at each side of the vehicle to obtain a true measure of vehicle linear speeds at each side during cornering. A steering wheel 22 is monitored by a steering angle sensor 23 which provides an input signal to the controller 16.

Figure 2:
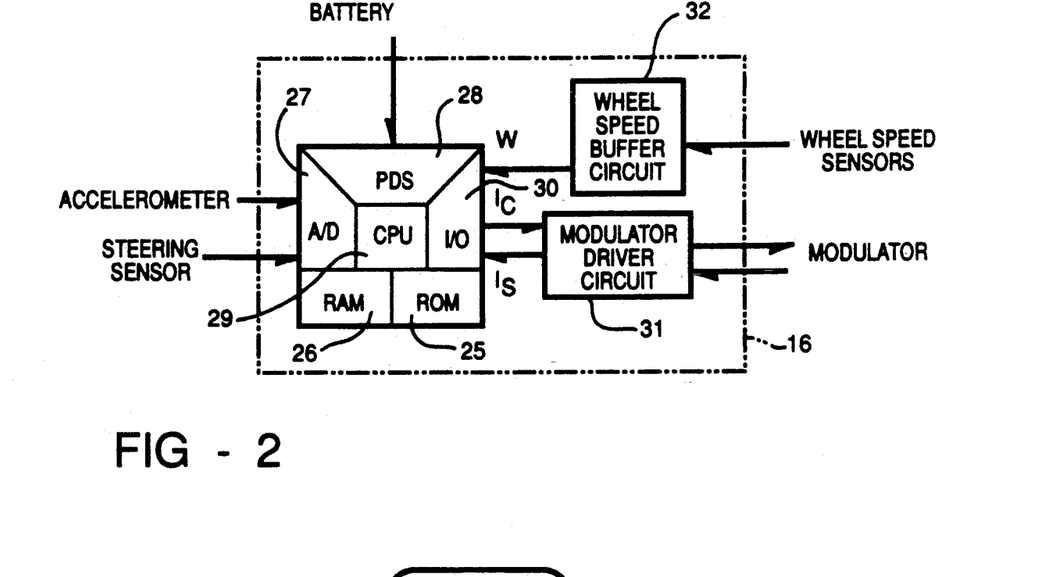
FIG. 2 is a diagram of the electronic controller of FIG. 1.

As shown in FIG. 2, the electronic controller 16 consists of a common digital computer composed of a read-only memory (ROM) 25, a random access memory (RAM) 26, an analog-to-digital conversion port (A/D) 27, a power supply device 28, an instruction processing architecture embodied in a central processing unit (CPU) 29, and input/output (I/O) ports 30 which interface to a modulator driver circuit 31 and a wheel speed sensor buffer circuit 32. The modulator driver circuit 31 receives control commands and also feeds back brake pressure information to the ports 30. The A/D 27 accepts input signals from the accelerometer 22 and steering wheel angle sensor 23.

The ROM 25 contains the instructions necessary to implement the algorithm diagrammed in FIGS. 3 and 11-15. In describing the functions of the algorithm, references to tasks which have been detailed in flow diagram function blocks are designated by <nn>, where nn is the block reference number.

When the antilock system is powered up, via the vehicle ignition circuit or other means, the controller 16 will begin executing the instructions coded in ROM 25.

Figure 3:
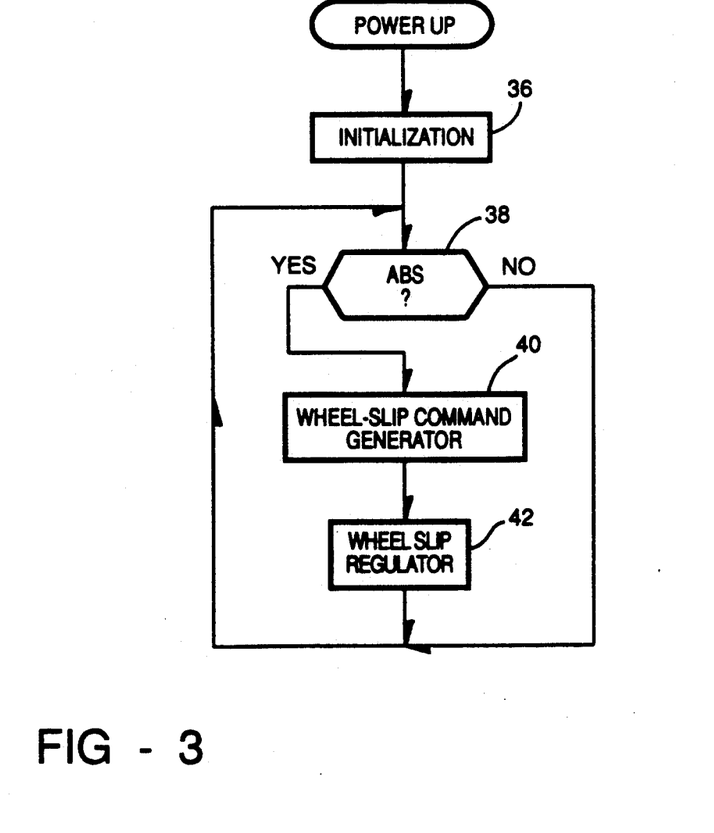
FIGS. 3 and 11-15 are flow diagrams representative of the algorithm for controlling the antilock braking according to the invention.

As shown in FIG. 3, the controller 16 will first perform system initialization <36>, which entails clearing registers, initializing specified RAM variables to calibrated values, stabilizing voltage levels at the A/D, and other basic functions of the digital computer. Also during initialization the controller enables the data sampling and control interrupt occurring at each 8 ms, for example, and resets certain control flags such as evasive and cornering flags, set a straight line flag, and resets offsets and corrections calculated during a prior operation.

After initialization the system keeps checking an ABS flag <38> which indicates whether the braking system is in the antilock mode. In block 38 the process includes reading wheel speeds, processing wheel deceleration during braking from the speed information, and comparing the wheel deceleration with a predetermined threshold. If the deceleration exceeds the threshold, an ABS flag is set. This block also computes for wheel slips by first estimating vehicle speed during braking, computing wheel slip from wheel speed measurement and vehicle speed estimation and further compares wheel slip with a predetermined threshold; if the slip exceeds the threshold, the ABS flag is also set. In general, the above two methods are combined; occurrence of either case sets the ABS flag. Three mutually exclusive flags that are set in response to steering wheel inputs are a straight line flag, a cornering flag, and an evasive flag. For steering wheel rotation rates below a threshold, say, 200°/sec, the straight line flag is set for steering wheel positions between 0° and 30°, and a cornering flag is set for steering wheel positions between 30° and 225°. The evasive flag is set for aggressive steering maneuvers indicated by steering wheel positions above 225° or for steering rates above 200°/sec.

If the ABS flag is set, a wheel slip command is generated <40> by processes to be explained below. Then the wheel slip is regulated <42> in accordance with the slip command in the manner disclosed in the above mentioned Research Disclosure publication. A wheel slip error is calculated as the slip value less the slip command. A slip error rate is derived from the time differential of the slip error, and a switching index s is formed as a sum of the slip error and slip error rate times a coefficient C. The pressure actuator is controlled to increase pressure when the index s is less than $-e$, to decrease pressure when the index s is greater than e, and to hold the pressure when the absolute magnitude of the index s is less then e, where e is a limit value such as 0.01. The value of C can be scheduled according to the vehicle speed, wheel speed, road surface, etc., to reach a precise control of wheel slip at its target level. Consequently, when the peak adhesion of road surface is identified for a straight line vehicle motion, this control method will yield a maximum tractive force at the tire. In this manner the pressure for each wheel brake is established. Although not essential to the present invention, calculations of compensation for split-/$\mu$ surfaces may be made and incorporated into the pressure command for each wheel. The rate of pressure increase for wheels on the high-$\mu$ side is limited in accordance with the severity of the split-$\mu$ to improve handling by decreasing the tendency to yaw.

The step 40 of generating a wheel slip command for each wheel comprises determining the peak slip which generates the maximum amount of surface adhesion and subtracting from the peak slip calculated values to offset cornering effects and evasive effects which occur at high rates of steering angle change or at high steering angles to arrive at a target slip. In addition, when a single measured or estimated vehicle speed is used for wheel slip calculations an error results during a cornering maneuver because the inside wheels and outside wheels of the vehicle have different linear speeds. Then a geometry correction is calculated for inside and outside wheels and is used to increase the calculated inside slip command and decrease the outside slip command. The constituents of the wheel slip command are peak slip, cornering offset, evasive offset and a geometry correction term, defined as follows.

Peak Slip: Prior technology has devised schemes for determining the peak slip at which maximum surface adhesion occurs at the tire/road contact. The U.S. Pat. No. 4,947,332 to Ghoneim, which is incorporated herein by reference, discloses a method of determining the coefficient of friction during operating conditions and from that information determine the critical or peak slip value at which the maximum coefficient occurs. The Ghoneim patent is applied specifically to preventing excessive spin of driven wheels, but the principles disclosed therein directly apply to the case of braking wheels. According to that patent, slip and acceleration of each wheel is measured, vehicle acceleration is measured, a coefficient of friction is determined between each wheel and the road surface as a function of the measured vehicle acceleration and the measured wheel acceleration, and determining for each wheel the peak value of slip where the rate of change in the ratio of the determined coefficient of friction to the measured wheel slip is at a minimum.

The peak slip value is used to optimize the adhesion at the tire/road interface in the direction of wheel rotation. The adhesion in the lateral direction, however, is at a maximum at zero slip and is well below its maximum value when the slip is at the peak value. During cornering, when lateral force becomes important to vehicle handling, the lateral force can be increased by decreasing the slip at each wheel, and especially at the outer wheels (the wheels at the outside of the turn). The amount of slip decrease is determined by computed or empirically determined functions of steering wheel position, the steering wheel rate of turning, and vehicle deceleration. Further, when only the average vehicle speed is known, the slip values are corrected by geometrical functions which vary according to steering wheel position, vehicle deceleration and vehicle speed. All these functions are stored in look-up tables for use by the microcomputer in deriving the final slip value for each wheel. In the ensuing FIGS. 4-10, these tabulated function are depicted in graphic form.

Figure 4:
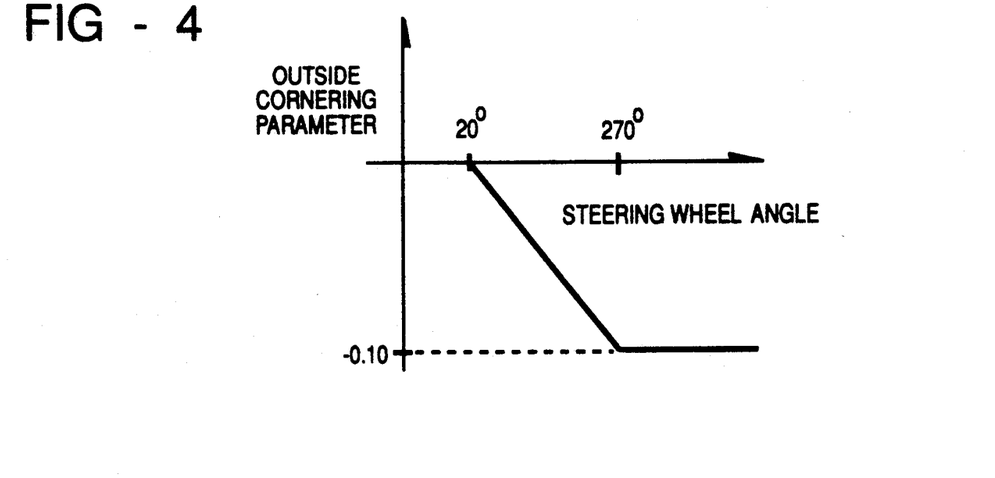
FIGS. 4-10 are graphs showing the functions used by the algorithm to compute offsets and corrections for improved handling.
Figure 5:
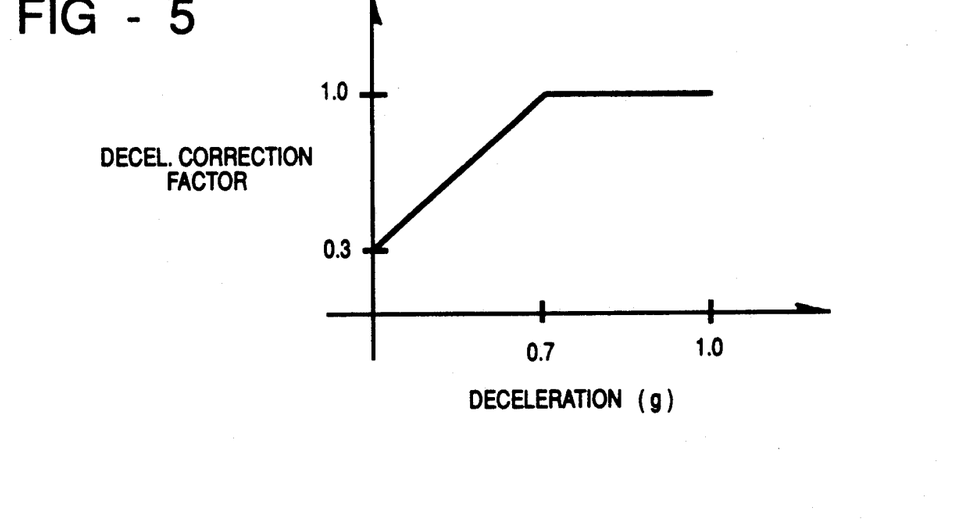

Cornering offset: To allow greater lateral force when cornering, the peak slip is reduced by an offset determined empirically as a function of steering angle and vehicle deceleration. The wheels at the outside of the turn have a greater offset than those at the inside of the turn. Thus if the steering wheel is turned to the right, the left wheel would be assigned a larger offset. FIG. 4 shows the steering angle function of the cornering parameter for the outside wheel. For steering angles less than 20° the value is zero, for angles between 20° and 270° the value increases linearly in the negative direction to 0.1 (10% slip) and remains at that value for larger angles. To obtain a corresponding parameter for the inside wheels the outside parameter is multiplied by a value less than 1, such as 0.8. Since the cornering offsets are also a function of vehicle deceleration, the parameters are multiplied by the factor shown in FIG.

5 which varies linearly from 0.3 at no deceleration to 1 at 0.7 g deceleration and remains at 1 for higher deceleration.

Figure 6:
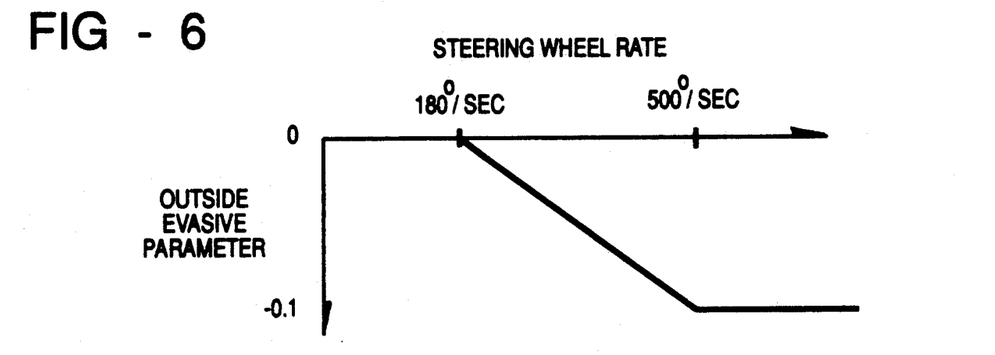

Evasive Offset: It has been found that evasive maneuvers characterized by high rate of steering wheel rotation require a further reduction of slip to provide greater lateral force during the maneuver. FIG. 6 shows the empirically determined function for the evasive parameter for an outside wheel, the inside wheel parameter being determined by reducing the outside parameter in the same manner term as the cornering offset. The outside evasive parameter is 0 below a threshold of 180°/sec and varies linearly from 0 at 180°/sec to −0.1 at 500°/sec and remains at −0.1 for higher rates. The evasive offsets are also functions of vehicle deceleration and, as in the cornering offset calculation, the evasive parameters are multiplied by the FIG. 5 deceleration correction factor to arrive at the evasive offsets.

Geometry Correction Term: During a vehicle cornering maneuver, the inside and outside of the vehicle have different linear speeds. Ideally, the wheel slip of each side needs to be calculated using the true linear speed of the respective side. This can be done when a separate accelerometer 22 or ground speed sensor is used for each side. When an average vehicle speed is used instead, there is an error incurred because the inner linear speed is really lower than the average vehicle speed and the outer linear speed is higher than the average vehicle speed. As a result, the computation will show a positive bias to the true slip on the inner wheel slip and a negative bias to the true slip on the outer wheel slip. The geometry correction term compensates for such bias by supplying a positive term for the inner wheel slip and a negative term for the outer wheel slip.

Figures 7, 8, 9:
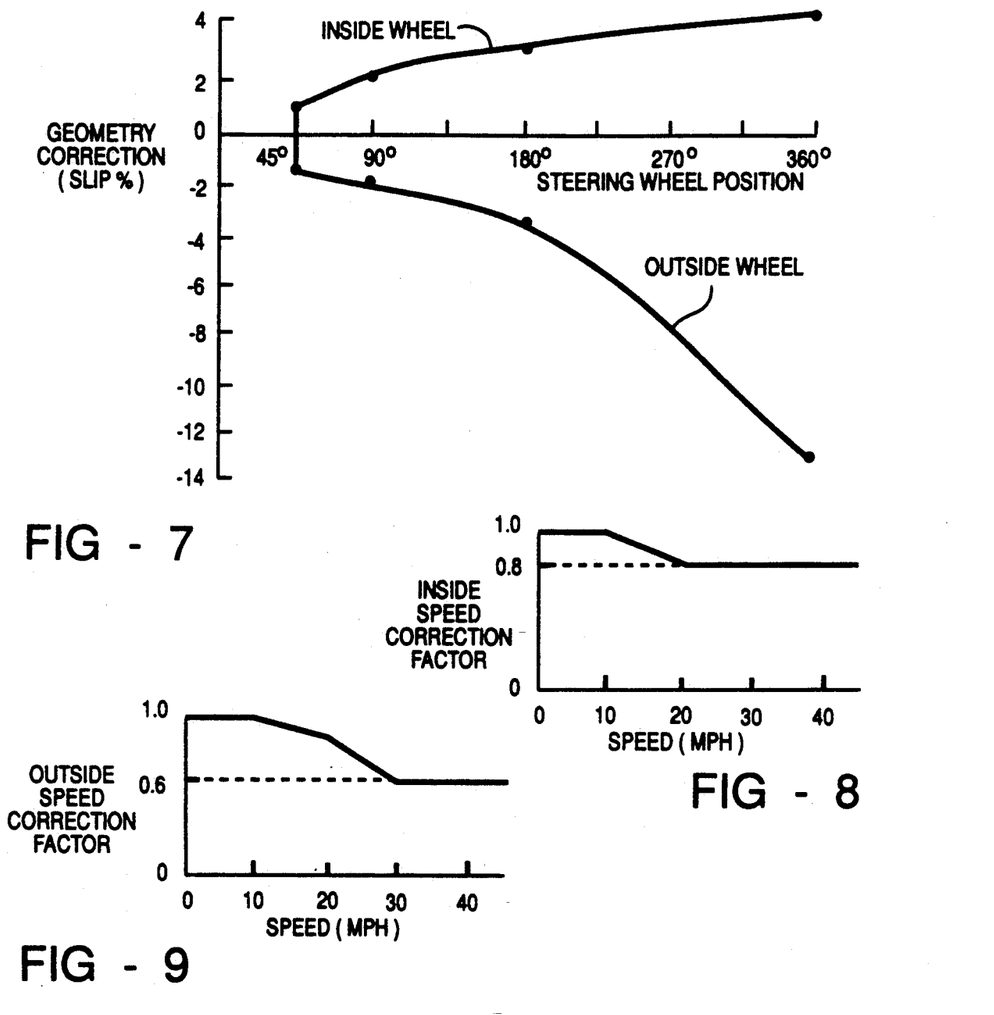
Figure 10:
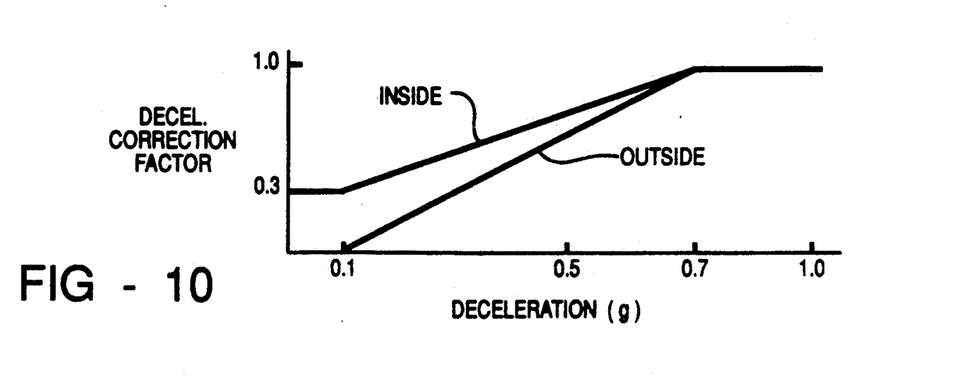
Figure 11:
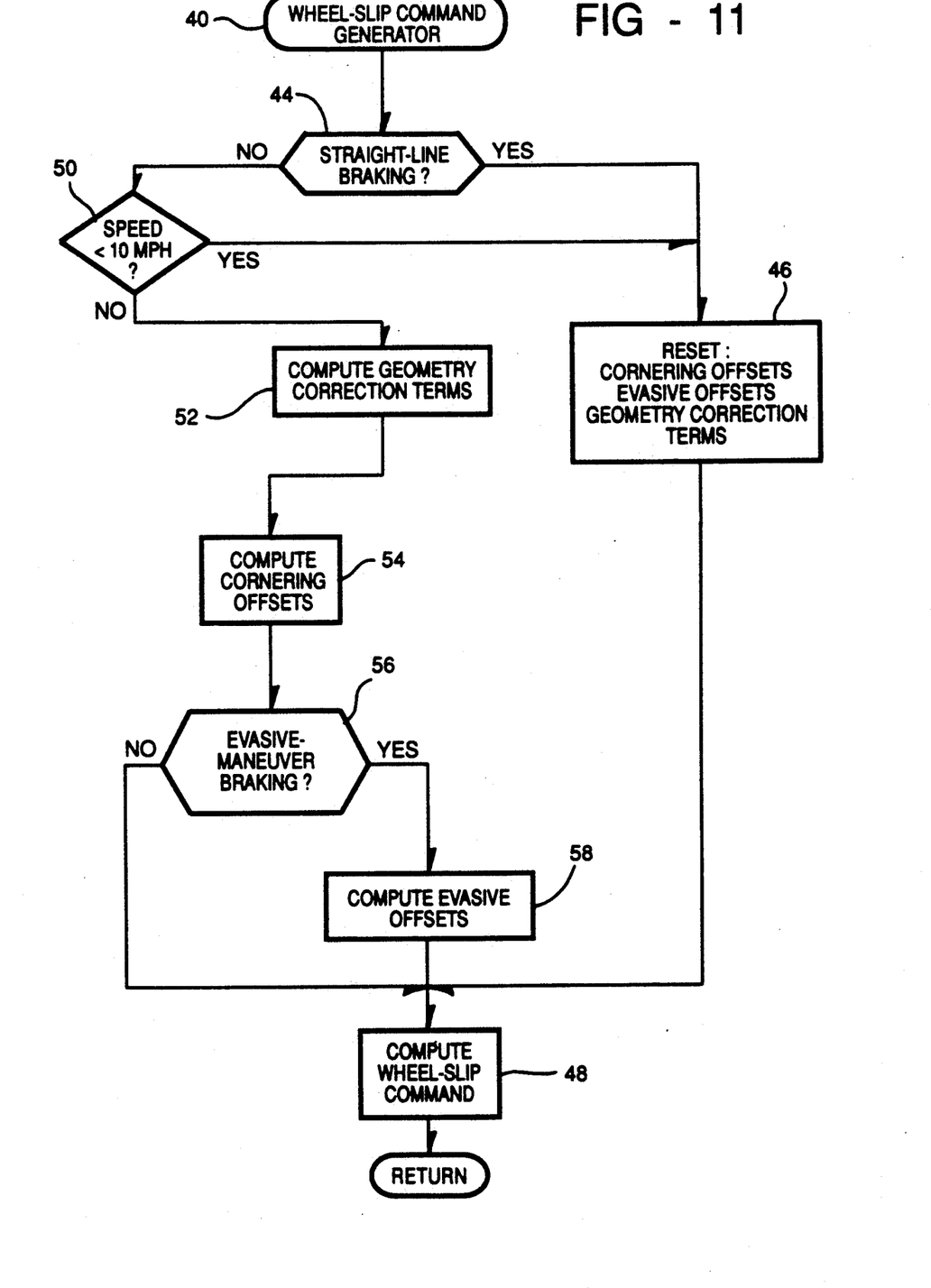

FIG. 7 shows the geometry correction as a function of steering wheel position which is determined with vehicle test data or via computation of vehicle geometry. No correction is made for steering angles less than 45°. For greater angles up to 360° the correction for the inside wheel increases nonlinearly in the positive direction from 1% to 4% slip, while the correction for the outside wheel increases nonlinearly in the negative direction from 1% to 13% slip. These values must be adjusted for the effects of vehicle speed and deceleration. Those adjustments are also determined empirically or computed from the vehicle geometry. FIG. 8 shows the inside speed correction factor which is 1 from 0 to 10 mph, gradually decreases to 0.8 between 10 and 20 mph and remains at 0.8 for higher speeds. FIG. 9 shows the outside speed correction factor which is 1 from 0 to 10 mph, gradually decreases to 0.9 at 20 mph, then to 0.6 at 30 mph and remains at 0.6 for higher speeds. The inside and outside deceleration correction factors are shown in FIG. 10. The inside function is 0.3 between 0 and 0.1 g, and linearly increases to 1 between 0.1 and 0.7 g. The outside factor is 0 below 0.1 g and linearly increases to 1 between 0.1 and 0.7 g. To calculate the net geometry correction terms the inside and outside values from FIG. 7 are multiplied by the respective speed correction and deceleration correction factors.

The algorithm for carrying out the necessary calculations for the wheel slip command is shown in the flow charts of FIGS. 11-15. The overall scheme of the wheel slip command algorithm 40 is presented in FIG. 11. The straight line and evasive flags established in step 38 are used to determine the active path through the program. If the straight line flag is set <44>, the cornering and evasive offsets and geometry correction terms are reset or nulled <46> and the wheel slip command is computed <48> without any offsets or corrections. The same is true if the straight line flag is not set and the vehicle speed is less than 10 mph <50>. When the speed is above 10 mph, the geometry correction offsets are computed <52> and the cornering offsets are computed <54>. If the evasive flag is not set <56> the wheel slip command is computed <48> without evasive offsets but if the evasive flag is set the evasive offsets are computed <58> and used in the wheel slip command calculation.

Figures 12, 13:
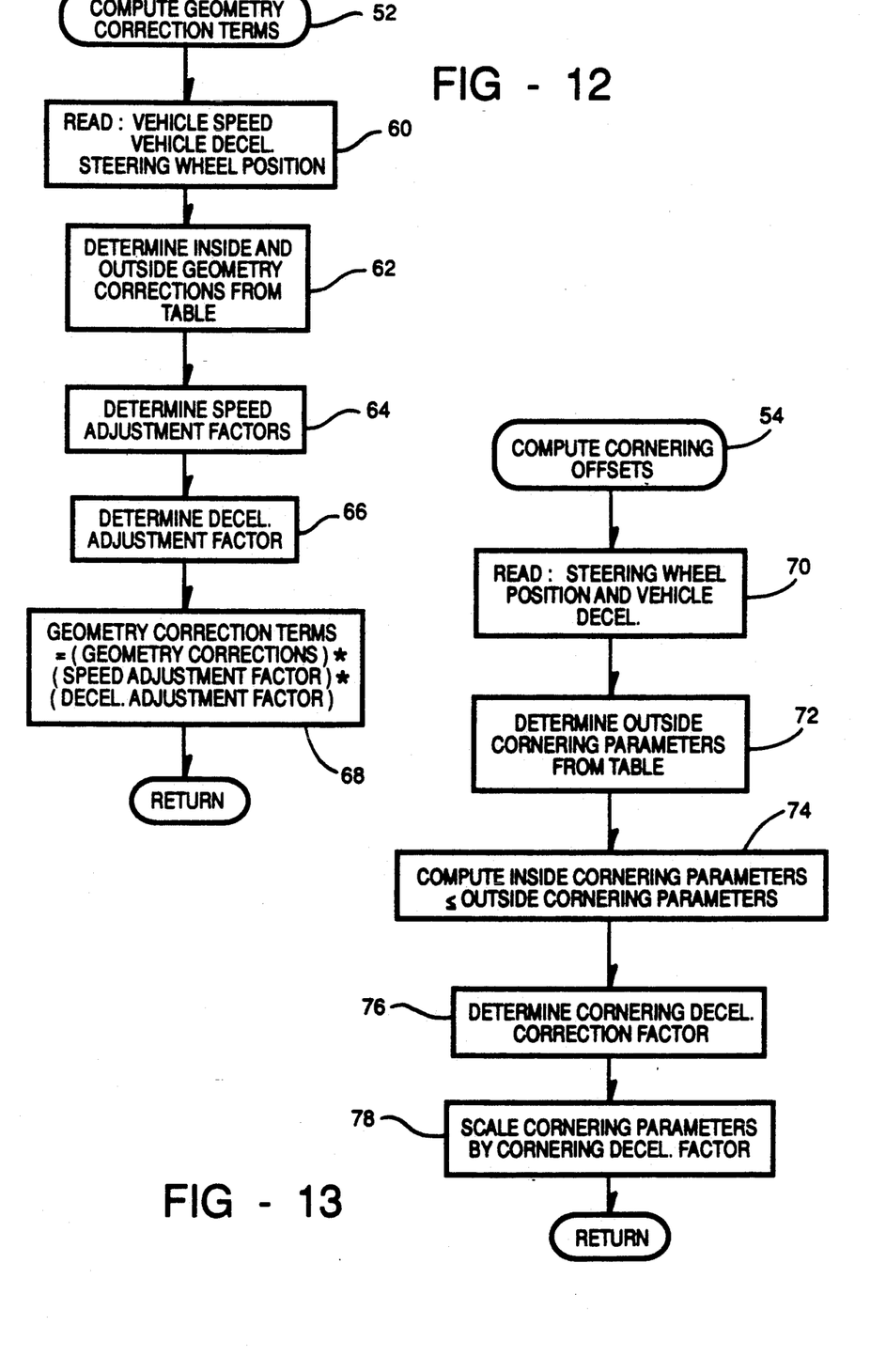

FIG. 12 shows the routine for computing the geometry correction terms 52. Vehicle speed, deceleration and steering wheel position are read <60>, and the inside and outside slip corrections are determined from the tables represented by FIG. 7 <62>. Then the speed adjustment factor shown in FIGS. 8 and 9 are determined <64>, the deceleration factors shown in FIG. 10 are determined <66>, and the geometry correction term is calculated separately for the inside and outside wheels by multiplying each geometry correction by the respective speed and deceleration factors <68>. The inside and outside geometry terms are stored separately.

FIG. 13 shows the routine for computing cornering offsets 54. Steering wheel position and vehicle deceleration are read <70> and the outside cornering parameter is determined by the table represented by FIG. 4 using the steering wheel angle <72>. The inside cornering parameter is calculated by multiplying the outside parameter by a coefficient equal to or less than 1, for example 0.8 <74>. The deceleration correction factor is determined from the table represented by FIG. 5 <76> and the final cornering offsets are determined by multiplying the inside and outside parameters by the deceleration factor <78>. The final inside and outside cornering offsets are separately stored.

Figure 14:
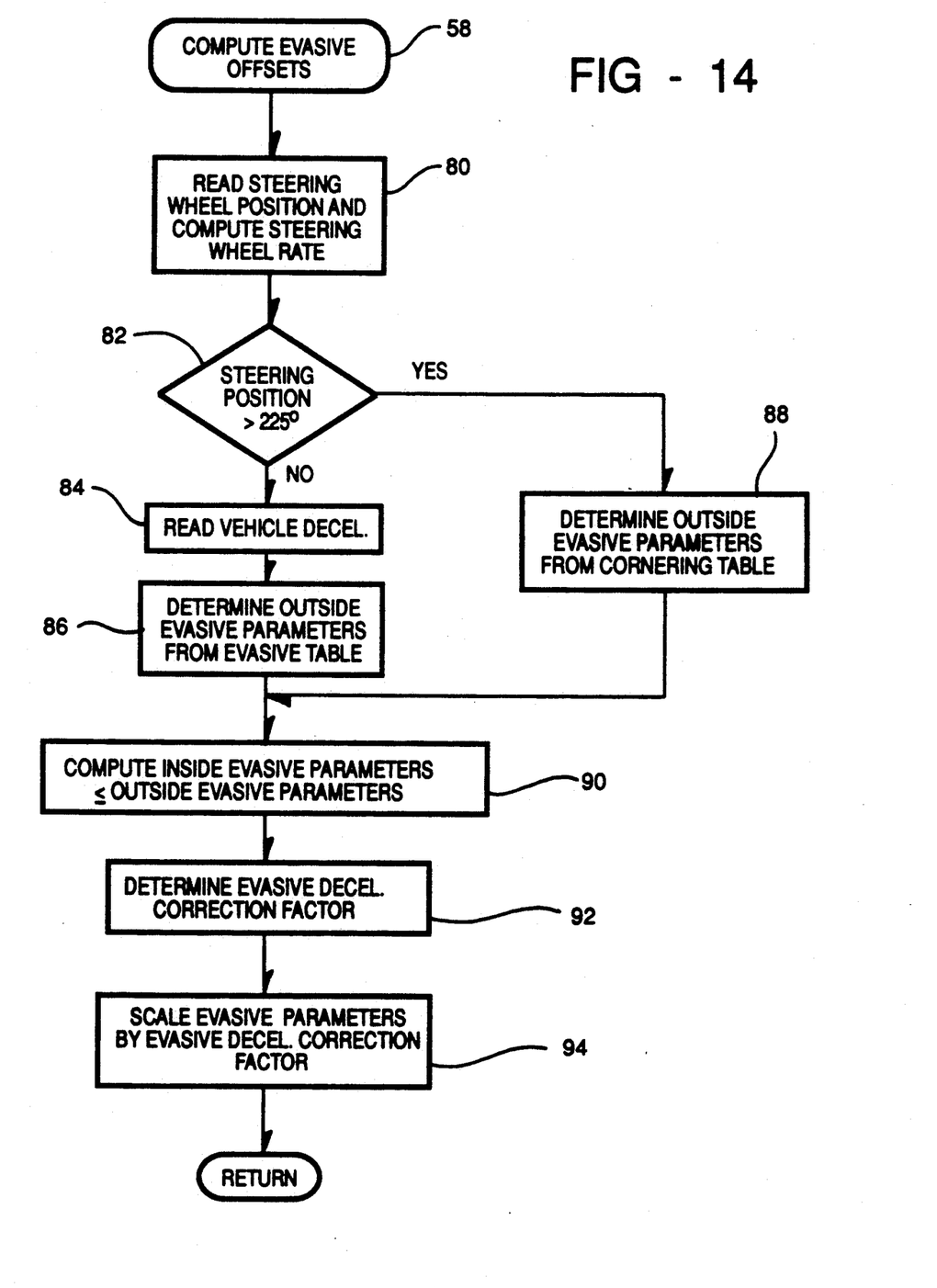

The routine for computing evasive offsets 58 is shown in FIG. 14. The steering wheel position is read and its rate of rotation is computed <80>. If the steering wheel position is less than 225°, <82>, the vehicle deceleration is read <84> and the outside evasive parameters are determined from the evasive parameter table represented by FIG. 6 <86>. However if the steering wheel position is greater than 225° <82>, the outside evasive parameter is determined from the cornering parameter table represented by FIG. 4 <88>. Then the outside evasive parameter, however determined, is multiplied by a coefficient equal to or less than 1, for example 0.8, to derive the inside evasive offset <90>. The evasive deceleration correction factor is determined from the table represented by FIG. 5 <92> and is multiplied by the computed inside and outside parameters <94> to obtain the final evasive offsets. The inside and outside evasive offsets are separately stored.

Figure 15:
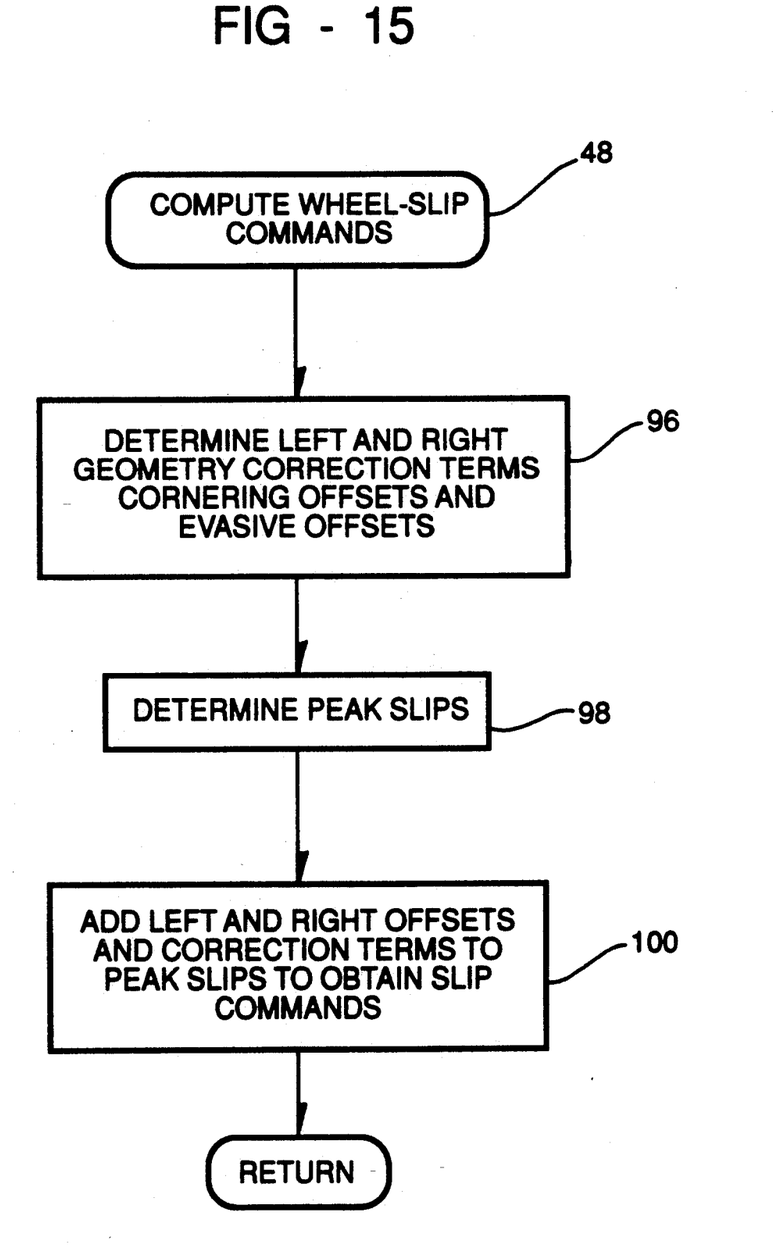

The routine 48 for the computation of wheel slip commands is depicted in FIG. 15. The direction of steering wheel rotation is determined from the steering angle sensor output so that for a right turn the left wheels are identified as outside wheels etc. Then the outside and inside offsets and correction terms are designated as right or left offsets and terms as the case may be <96>. Next, the peak slip for each wheel is determined <98> and the left and right offsets and correction terms are added to the peak slips of the left and right wheels, respectively <100>.

As a corollary to the above described algorithm for determining adjustments comprising cornering and evasive offsets which are summed with peak slip to define the target slip, it will be apparent that the adjustments can be expressed as factors or reduction ratios which are multiplied with the peak slip to obtain the target slip. In that case, the empirical cornering and evasive parameters are calibrated for the purpose of calculating such factors and have values between 0 and 1. Since reduction ratios are used instead of offsets, the calculated evasive and cornering reduction ratios for outside wheels are increased by a constant factor to obtain the reduction ration for an inside wheel.

Figure 16:
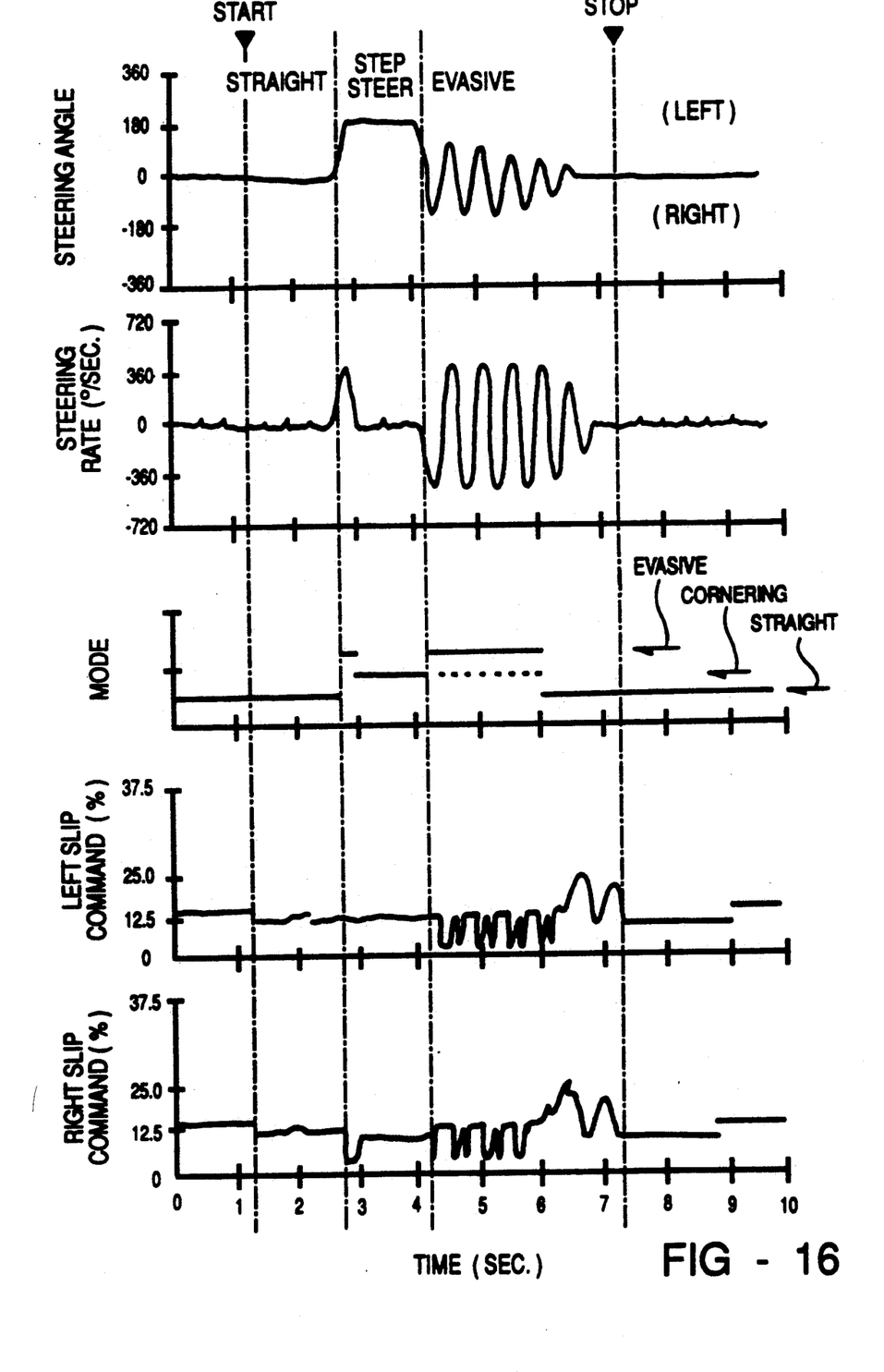
FIG. 16 is a set of graphs illustrating antilock brake operation in accordance with the invention.

The graphs of FIG. 16 illustrate the operation of the slip command generation in a vehicle. The graphs show steering angle, steering rate, mode, and left and right slip commands. The brakes begin antilock operation at the time marked "start" and end such operation at the time marked "stop" when the vehicle stops. After "start" the steering is straight for 1.5 sec and then a step steer to the left occurs and after another 1.5 sec the an evasive maneuver is simulated by rapidly rotating the steering wheel back and forth for 3 sec. Prior to "start" each slip command was held at a default value of 13%. After "start" the peak slip computation put the slip values at a slightly lower level which varied according to the measured adhesion properties. When the step steer occurred, the brief high steering rate triggered the evasive mode for a brief period during which period the right (outside) slip command dropped to a low level. After the brief evasive period the high steering angle caused the cornering mode to be invoked which caused the right slip to increase to a level above the evasion level but still lower than that experienced during the straight line operation. Then during the period of evasive maneuvering the evasive mode was set and as the steering wheel was turned one way and then the other way the right and left slip commands alternated in low and "normal" levels. As the vehicle speed dropped to the 10 mph cut-off (block 50) just before stopping, the straight line mode was entered and the offsets and corrections no longer were applied to the slip computation. Then the slip commands increased in pulsing fashion to high slip values which reflect high adhesion levels which are characteristic at such low speeds.

The embodiments of the invention in which an exclusive property or privilege is claimed are defined as follows:

1. In a vehicle having an antilock brake system, a method of enhancing cornering ability during antilock brake operation comprising the steps of:
   measuring vehicle deceleration;
   determining a wheel slip of each wheel;
   sensing an amount of steering wheel rotation and calculating the rate of said steering wheel rotation;
   calculating for each wheel a peak slip value which can generate the highest amount of surface adhesion;
   calculating a cornering term for each wheel as a function of said steering wheel rotation;
   calculating an evasive term as a function of said calculated rate of said steering wheel rotation and said measured vehicle deceleration;
   calculating a target slip value of each wheel as a function of the evasive term, the cornering term and the peak slip value; and
   regulating each wheel to the respective target slip value.

2. The invention as defined in claim 1 wherein the step of determining the slip of each wheel comprises:
   measuring each wheel speed;
   estimating vehicle speed during braking;
   estimating each wheel slip from said measured wheel speed and said estimated vehicle speed;
   compensating each estimated wheel slip by inside and outside geometry correction terms which account for the difference in wheel speed of wheels inside and outside of the path of travel and said correction terms are a function of said steering wheel rotation, said estimated vehicle speed and said vehicle deceleration, wherein the estimated slip of the inside wheels is decreased by the inside correction term and the estimated slip of the outside wheels is increased by the outside correction term.

3. The invention as defined in claim 2 wherein the step of compensating each estimated wheel slip comprises:
   determining inside and outside wheel geometry parameters from separate tables of said geometry parameters addressed by the amount of said steering wheel rotation;
   determining a deceleration correction value from a predetermined function of said measured vehicle deceleration;
   determining a speed correction value as a predetermined function of said estimated vehicle speed;
   calculating the geometry correction terms as the products of the current values of the respective geometry parameters, and the deceleration correction value, and the vehicle speed correction value.

4. In a vehicle having an antilock brake system, a method of enhancing cornering ability during antilock brake operation comprising the steps of;
   measuring vehicle deceleration;
   determining a wheel slip of each wheel;
   sensing an amount of steering wheel rotation and calculating the rate of said steering wheel rotation;
   calculating for each wheel a peak slip value which can generate the highest amount of surface adhesion;
   calculating a cornering offset for each wheel as a function of said steering wheel rotation;
   calculating an evasive offset as a function of said calculated rate of said steering wheel rotation and said measured vehicle deceleration;
   calculating a target slip value of each wheel as the sum of the evasive offset, the cornering offset and the peak slip value; and
   regulating each wheel to the respective target slip value.

5. The invention as defined in claim 4 wherein the step of calculating an evasive offset comprises:
   establishing empirical parameters for evasive correction as a function of the rate of steering wheel rotation;
   establishing empirical values for deceleration correction as a function of said measured vehicle deceleration;
   determining the evasive correction parameter and deceleration correction value for current steering wheel rate and vehicle deceleration; and
   calculating the evasive offset by multiplying the evasive correction parameter by the deceleration correction value.

6. The invention as defined in claim 5 wherein the absolute value of the evasive correction parameter is zero below a steering wheel rotation rate threshold and gradually increases to a maximum value at rates above the threshold.

7. The invention as defined in claim 5 wherein said evasive offset for wheels outside the vehicle path is larger than wheels inside the path, and wherein said calculated evasive offset for an outside wheel is reduced by a constant factor to obtain a reduced evasive offset for an inside wheel.

8. The invention as defined in claim 6 wherein the deceleration correction parameter is a value less than unity at zero deceleration and gradually increases to unity at larger deceleration values.

9. The invention as defined in claim 4 wherein the step of calculating a cornering offset term comprises:
   establishing empirical parameters for cornering correction as a function of the steering wheel rotation;
   establishing empirical values for deceleration correction as a function of said measured vehicle deceleration;
   determining the cornering parameter and deceleration correction values for current steering wheel rotation and vehicle deceleration; and
   calculating the cornering offset by multiplying the cornering parameter by the deceleration correction.

10. The invention as defined in claim 5 wherein said cornering offset for wheels outside the vehicle path is larger than wheels inside the path, and wherein said calculated cornering offset for an outside wheel is reduced by a constant factor to obtain a reduced cornering offset for an inside wheel.

11. In a vehicle having an antilock brake system, a method of enhancing cornering ability during antilock brake operation comprising the steps of:
   measuring vehicle deceleration;
   determining a wheel slip of each wheel;
   sensing an amount of steering wheel rotation and calculating the rate of said steering wheel rotation;
   calculating for each wheel a peak slip value which can generate the highest amount of surface adhesion;
   calculating a cornering reduction ratio for each wheel as a function of said steering wheel rotation,
   calculating an evasive reduction ratio as a function of said calculated rate of said steering wheel rotation and said measured vehicle deceleration;
   calculating a target slip value of each wheel as the product of the evasive reduction ratio, the cornering reduction ratio and the peak slip value; and
   regulating each wheel to the respective target slip value.

12. The invention as defined in claim 11 wherein the step of calculating an evasive reduction ratio comprises:
   establishing empirical parameters with values ranging from zero to unity for evasive correction as a function of the rate of steering wheel rotation;
   establishing empirical values for deceleration correction as a function of said measured vehicle deceleration;
   determining the evasive correction parameter and deceleration correction value for current steering wheel rate and vehicle deceleration; and
   calculating the evasive reduction ratio by multiplying the evasive correction parameter by the deceleration correction value.

13. The invention as defined in claim 12 wherein said evasive reduction ratio for wheels outside the vehicle path is smaller than wheels inside the path, and wherein said calculated evasive reduction ratio for an outside wheel is increased by a constant factor to obtain an increased evasive reduction ratio for an inside wheel.

14. The invention as defined in claim 11 wherein the step of calculating a cornering reduction ratio term comprises:
   establishing empirical parameters ranging from zero to unity for cornering correction as a function of the steering wheel rotation;
   establishing empirical values for deceleration correction as a function of said measured vehicle deceleration;
   determining the cornering parameter and deceleration correction values for current steering wheel rotation and vehicle deceleration; and
   calculating the cornering reduction ratio by multiplying the cornering parameter by the deceleration correction.

15. The invention as defined in claim 14 wherein said cornering reduction ratio for wheels outside the vehicle path is smaller than wheels inside the path, and wherein said calculated cornering reduction ratio for an outside wheel is increased by a constant factor to obtain an increased cornering reduction ratio for an inside wheel.

* * * * *